UNITED STATES PATENT OFFICE.

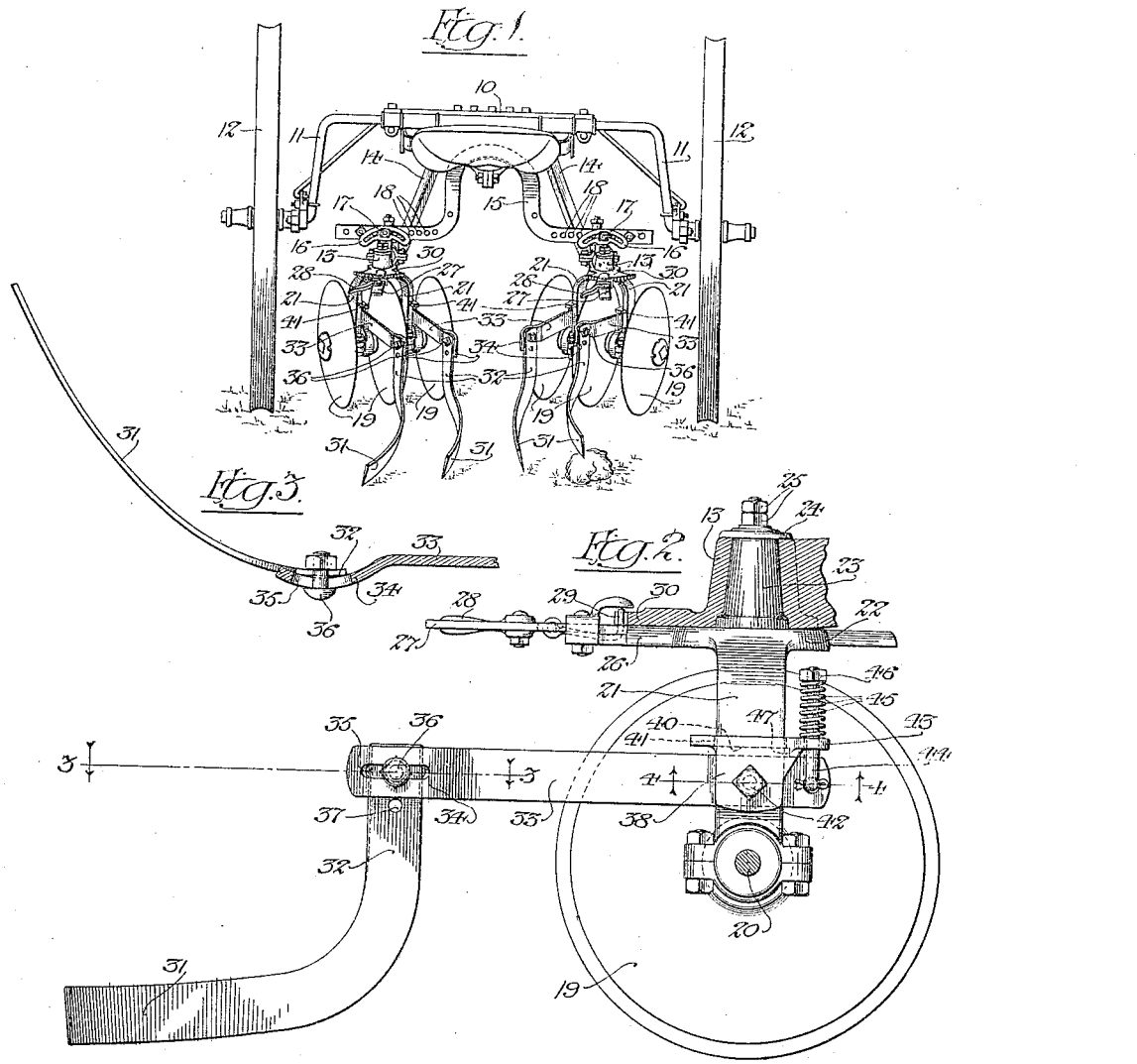

CLEMENT W. MICHAEL, OF RACINE, WISCONSIN, ASSIGNOR TO J. I. CASE PLOW WORKS, OF RACINE, WISCONSIN, A CORPORATION.

DISK CULTIVATOR.

1,144,151.          Specification of Letters Patent.      Patented June 22, 1915.

Application filed December 7, 1912. Serial No. 735,569.

*To all whom it may concern:*

Be it known that I, CLEMENT W. MICHAEL, a citizen of the United States, and a resident of Racine, county of Racine, and State of Wisconsin, have invented certain new and useful Improvements in Disk Cultivators, of which the following is a full, clear, and exact description.

The invention relates to disk cultivators and more particularly to the trailing leveler blades which are associated with the disk gangs of the cultivator for leveling the soil turned up by the disks. In disk cultivators means are usually provided for adjusting the angle of the disk gangs relatively to the line of draft. When the disk gangs are so adjusted to extreme positions, the levelers are thrown to one side or the other out of proper relation to the disks.

The present invention seeks to provide a simple and effective construction in which independent means are provided for adjusting the angle of the leveler blades, so that they may be properly positioned relatively to the disks when the latter are adjusted to one side or the other.

Further objects of the invention are to provide supporting means for the knife levelers which may be readily attached and removed from the disk gangs and in which springs are provided for yieldingly holding the leveler blades in working position, so that they may properly follow the disks in uneven ground or yield when they strike an obstruction.

The invention consists in the features of improvement hereinafter set forth, illustrated in the preferred form in the accompanying drawing and more particularly pointed out in the appended claims.

Figure 1 is a rear view of the cultivator with the disk gangs and improved leveler blades shown in perspective. Fig. 2 is a side elevation of the disk gang with one of the disks removed and the gang support shown in section. Figs. 3 and 4 are detail sections on the lines 3—3 and 4—4, respectively, of Fig. 2.

The frame of the cultivator may be of any suitable construction. As shown in Fig. 1, the frame 10 is carried upon an arched axle 11 which, in turn, is carried by the wheels 12. The gangs of the cultivator are carried by suitable supports 13 which are connected to the rear ends of drag bars 14. In the construction shown, the supports 13 are also connected to the horizontal ends of a transverse arch bar 15. Each support 13 is provided with a part 16 which is adjustably connected to the adjacent end of the arch bar 15 by a bolt 17, the latter being arranged to engage any one of a number of holes 18 in the horizontal end of the arch bar. The part 16 is preferably provided with a segmental slot, as shown, through which the bolt 17 extends, so that the inclination of the disk to the surface of the ground may be adjusted.

Each gang, in the form shown, comprises three disks 19 which are mounted upon a shaft 20. This shaft is journaled in the lower ends of the side members 21 of a U-shaped yoke 22. At its upper portion the yoke is provided with a projecting boss or trunnion 23 which is rotatably mounted within a suitable bearing in the supporting member 13. A washer 24 and nuts 25 on the upper reduced end of the trunnion 23 connect the disk gang to the support 13 in such a manner that the gang may be adjusted to vary the angle of the disks in horizontal direction or relatively to the line of draft. In the construction shown, the yoke is provided with a rearwardy projecting arm 26 having a hand lever 27 connected thereto. A handle 28 on the lever is connected to a dog 29 which engages a notched segment 30 on the lower rear portion of the supporting member 13. By means of the lever 27, the disk gang may be turned to vary the angle of the disks and by means of the dog 29 and notched segment 30, the disk gang can be locked in adjusted position.

The parts thus far described may be of any usual or suitable construction.

The leveler knives or blades 31 are of the usual curved form and are provided at their forward ends with upturned vertical portions 32. The upturned portions 32 at the forward ends of the leveler blades are connected to the rear ends of supporting arms 33 and the latter are preferably secured at their forward ends to the side members 21 of the yokes of the disk gangs. To effect the independent adjustment of the leveler blades, the upturned vertical portions 32 thereof are connected to laterally curved faces upon the rear ends of the supporting arms 33 by adjustable connections. In the preferred construction shown, each supporting arm 33 is formed of a piece of strap iron arranged on edge and, at its rear end, it is provided with a laterally curved portion 34, the opposite side faces of which are concave and convex respectively in horizontal direction and straight in vertical direction. The curved portion 34 is also provided with a longitudinal slot 35 and a bolt 36 extends through the slot and through the upper end of the vertical portion 32 of the knife blade and clamps the latter against the concave face of the curved portion 34. The side edges of the vertical portion 32 of the leveler blade engage the concave face of the curved portion 34 of the arm in such a manner that a single bolt serves to securely clamp the leveler blade to the supporting arm. Moreover, by loosening the nut on the bolt and adjusting it through the longitudinal slot 35 of the curved portion, the angle of the leveler blade relatively to the line of draft may be adjusted, as desired. Ordinarily, when the gang as a whole is adjusted in horizontal direction to extreme position, the leveler blades are thrown too far to one side of the gang, but by means of the adjustable connection between the blades and the supporting arms 33, the blades can be properly positioned relatively to the disks whatever may be the angle of the disks relatively to the line of draft. As shown, the upturned portion 32 of the leveler blade is provided with an additional opening 37 for the bolt 36, so that the blade may be used on a gang having smaller disks.

The supporting arms 33 are pivotally mounted on the disk gangs and are preferably connected thereto in such a manner that they may be readily applied in position or removed, as desired. Each arm 33 is connected to the inner face of one of the side members or legs 21 of the disk supporting yokes by means of a cast metal bracket 38. The arm is arranged between the bracket and the side of the yoke member 21 and is pivotally mounted upon a projecting boss 39 (see Fig. 4) on the face of the bracket. At its upper edge, the bracket is provided with a laterally projecting flange 40 which engages the side face of the yoke member 21, and with extended lugs 41 which overlap the edges of the yoke member. By reason of this construction, a single bolt 42, which preferably extends through the boss 39, serves to hold the bracket 38 and the supporting arm 33 in position.

The bracket is provided at its upper, forward end with a perforated lug 43. A bolt 44 extends through the lug and its lower hooked end engages an opening in the forward end of the supporting arm 33. A spring 45 is coiled about the upper end of the bolt 44 and extends between the lug 43 and a nut 46 threaded on the upper end of the bolt. The lug 41 of the bracket is provided on its under face with a depending shoulder or stop 47 and the spring serves to uphold the forward end of the arm and to press the same against the shoulder or stop 47. The supporting arm 33 and the leveler blade 31 carried thereby are thus spring-held in position and the leveler blade can yield in vertical direction to properly follow the disks in uneven ground or upon striking an obstruction.

It is obvious that changes may be made in the details set forth without departure from the essentials of the invention as defined in the claims.

I claim as my invention:—

1. In a disk cultivator, the combination with a disk gang, of a trailing, horizontal, curved leveler blade having a rigid, upwardly extending end portion, connecting means between the upwardly extending forward end portion of said leveler blade and said disk gang, and means for simultaneously adjusting said gang and said leveler blade in horizontal direction to vary the angle of said disks and said blade relatively to the line of draft, said connecting means being arranged to effect the independent adjustment of said blade in horizontal direction.

2. In a disk cultivator, the combination of a yoke, disks journaled on said yoke, rearwardly extending arms connected to the arms of said yoke, curved, horizontal, leveler blades having upwardly extending forward portions, adjustable connections between said arms and the upwardly extending forward portions of said leveler blades, a support, and means for adjustably connecting said yoke to said support to vary the angle of said disks and said leveler blades relatively to the line of draft, said adjustable connections being arranged to effect the independent adjustment of said leveler blades in horizontal direction transverse to the line of draft.

3. In a disk cultivator, the combination with a disk gang, a rearwardly extending arm connected to said gang and having a horizontally curved rear end, and a horizontal leveler blade provided with an upturned forward end having an adjustable bolt and slot connection with the end of said arm, whereby said blade may be adjusted in a horizontal plane, substantially as described.

4. In a disk cultivator, the combination with a disk gang, a rearwardly extending arm connected to said gang and having a horizontally curved concavo-convex portion at its rear end provided with a longitudinal slot, a leveler blade having an upturned forward end, and a bolt extending through said slot and the upturned forward end of said blade for adjustably clamping the latter against the concave face of the curved rear end of said arm, substantially as described.

5. In a disk cultivator, the combination of a yoke, disks journaled on said yoke, a support to which said yoke is adjustably connected for varying the angle of the disks, rearwardly extending arms mounted on the members of said yoke, said arms having curved rear ends, leveler blades having upturned forward ends, and adjustable connections between the upturned forward ends of said blades and the curved rear ends of said arms for independently varying the angle of said blades, substantially as described.

6. In a disk cultivator, the combination of a yoke, disks journaled on said yoke, an arm pivoted adjacent its forward end to said yoke and projecting rearwardly therefrom, a curved, horizontal leveler blade mounted on the rear end of said arm and carried by said arm in rear of said disks, a spring interposed between said yoke and the forward end of said arm, and a stop on said yoke against which said arm is yieldingly held by said spring, substantially as described.

7. In a disk cultivator, the combination of a yoke, disks journaled on said yoke, a bracket secured to said yoke, an arm pivoted on said bracket, a trailing leveler blade carried by said arm, and a spring device interposed between said arm and bracket, said bracket having a stop against which said pivoted arm is yieldingly held by said spring device, substantially as described.

8. In a disk cultivator, the combination of a yoke, disks journaled on said yoke, a bracket secured to said yoke, an arm pivoted on said bracket, a trailing leveler blade carried by said arm, said bracket having a perforated lug on its forward end, a bolt connected to the forward end of said arm and extending through said lug, and a spring on said bolt for yieldingly holding said pivoted arm and said blade in working position, substantially as described.

9. In a disk cultivator, the combination of a yoke, disks journaled on said yoke, a bracket having lugs overlapping the edges of one of the side members of said yoke, a bolt for fastening said bracket to said yoke member, a rearwardly extending arm arranged between said yoke member and said bracket and pivotally mounted on the latter, a trailing leveler blade carried by said arm, and a spring device interposed between the forward ends of said arm and said bracket, the latter having a stop against which the forward end of said arm is yieldingly held by said spring device, substantially as described.

10. In a disk cultivator, the combination of a yoke, disks journaled on said yoke, a support to which said yoke is adjustably connected to vary the angle of said disks, rearwardly extending arms pivoted on the members of said yokes, stops on said yokes and springs yieldingly holding said arms in engagement with said stops, horizontal, curved leveler blades having upturned forward ends, and connections between the upturned forward ends of said blades and the rear ends of said arms for adjusting said blades in horizontal direction, substantially as described.

CLEMENT W. MICHAEL.

Witnesses:
STANLEY A. BREWER,
EDWARD E. WILLIAMS.

Copies of this patent may be obtained for five cents each, by addressing the "Commissioner of Patents, Washington, D. C."